Dec. 12, 1967 R. QUINBY, JR 3,357,610
HUMAN-APPEARING MANIKIN AND METHOD OF MAKING
Filed Feb. 18, 1963 8 Sheets-Sheet 2

RIPLEY QUINBY JR.
INVENTOR.

BY
Curtis, Morris, & Safford
ATTORNEYS

Dec. 12, 1967   R. QUINBY, JR.   3,357,610
HUMAN-APPEARING MANIKIN AND METHOD OF MAKING
Filed Feb. 18, 1963   8 Sheets-Sheet 5

Fig. 8

RIPLEY QUINBY JR.
INVENTOR.

BY
Curtis, Morris, & Safford
ATTORNEYS

United States Patent Office
3,357,610
Patented Dec. 12, 1967

3,357,610
HUMAN-APPEARING MANIKIN AND METHOD
OF MAKING
Ripley Quinby, Jr., Shelburne, Vt. 05482
Filed Feb. 18, 1963, Ser. No. 259,093
10 Claims. (Cl. 223—68)

The present invention relates generally to display manikins intended for use in store windows, for demonstrations, human substitutions, i.e., as artist's or photographer's models, and the like and in particular relates to a human-appearing manikin providing joint movements and positions truly corresponding with those of a human being and to the method of making these manikins.

Although manikins have been utilized for many years in store windows for display purposes and although extensive efforts have been made during all of this period of time to make the manikins appear human and natural in appearance, this objective has not been achieved in the prior art. Even in the most elaborate store window displays, there has been a certain unnaturalness or stiffness in the manikins which has distracted attention from the over-all artistic effort to be conveyed. For instance, efforts have been made to use manikins for purposes of displaying sports equipment in action. However, the stiffness or unnatural appearance of the manikins prior to this invention has prevented their use in illustrating the more dynamic sports movements, wherein the whole body is in action.

An object of the present invention is to provide a manikin having a truly human appearance and capable of assuming any pose or position which is natural to a human being.

A further object of the present invention is to provide a human-appearing manikin adapted for illustrating dynamic sports activities.

Among the many advantages of the present invention are those resulting from the fact that the manikin has an articulated skeleton which has the general configuration of the human skeleton and joints the swivels adapting the manikin to be cause to assume any pose or action position which is natural to a human figure. Moreover, the joints and swivels are readily fabricated from parts which are commercially available and are rugged in use. Advantageously, the hinge pin and the swivel joint are made from the same identical type of spring pin.

These joints and swivels are easy to adjust into different positions in use and desirably they provide sufficient frictional grip for holding the manikin in whatever adjusted position is desired.

Another advantage of the present invention results from the fact that it enables a human-appearing manikin form to be manufactured in an inexpensive manner by making a flexible mold of a living person, casting a rigid body figure in said mold, and forming a parting layer around said figure bisecting the space around said figure in two halves, front and back. Then the flexible mold is formed in two halves front and back around said figure and against said plane, and flexible front and back halves of said body figure are cast in the two halves of the flexible mold. Finally rigid front and back mold halves are formed around said flexible front and back halves of said body figure. Then, the whole body is molded in two halves of sponge rubber, resilient foam plastic or like material having a smooth or non-porous outer surface. These two halves are the front and back, which are thereafter cemented together with the skeleton between the two halves. Advantageously, the body and features of the face can be modeled after those of a living person or distinctiveness if desired so as to enhance the natural appearance of the manikin.

A further advantage of the joint and swivel skeleton structure as incorporated in the manikin shown herein as illustrative of the present invention is the hand which is articulated so that the fingers and thumb can be moved or bent into positions corresponding with those of the human hand.

In this specification and in the accompanying drawings is described and shown a human-appearing manikin embodying my invention and certain modified skeleton structures are illustrated, but it is to be understood that this example of a preferred embodiment is given for purposes of illustration in order that others skilled in the art may fully understand the invention and the manner of applying it in practical use.

The various objects, aspects, and advantages of the present invention will be more fully understood from a consideration of the following specification in conjunction with the accompanying drawings, in which corresponding reference numbers are used to refer to corresponding parts throughout the various figures.

Figure 1:
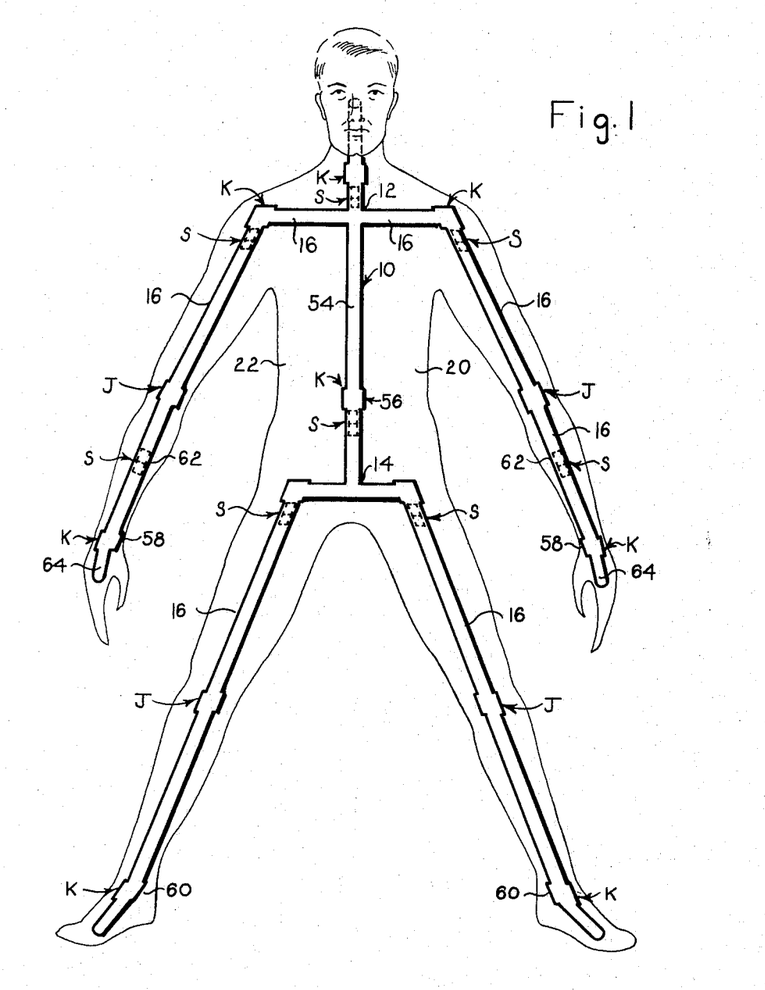
FIGURE 1 is a front view of a manikin embodying the present invention with the skeleton structure therein being illustrated.

As shown in FIGURE 1, a manikin embodying the invention in a preferred form includes an easy-to-assemble skeleton structure 10 comprising an X connection 12, a T connection 14 and a plurality of rigid rod-like or tubular elements 16 of appropriate lengths interconnected by joints and swivels, as will be explained in detail further below. These rigid elements 16 are formed of suitable strong, lightweight material, for example, they are of tubular aluminium, steel, etc. This skeleton structure is enclosed within a resilient flexible body form 20 which is molded in two halves, front and back, of resilient foam plastic or sponge rubber or like material having an outer surface 22 suitable for finishing purposes. The front and back resilient halves of the body form are each molded as a whole unit adapted to fit together about the skeleton frame structure 10. The adjacent surfaces of these two resilient halves of the body are indented by suitable mold cores in the regions to be occupied by the skeleton structure 10. The front and rear half of the body are cemented together about the skeleton frame structure 10 to form the body unit 20.

Figures 2, 3:
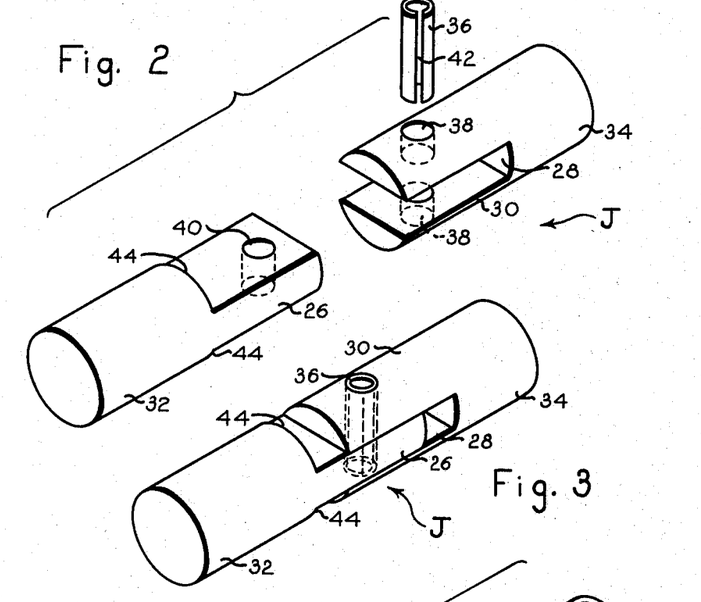
FIGURE 2 is an exploded perspective view of a joint, such as the elbow or knee joint, which can be flexed in one direction.
FIGURE 3 is a perspective view of this same joint after assembly.

FIGURES 2 and 3 illustrate a type of hinge joint, generally indicated at *J* which is adapted to be flexed in a single direction. As shown in FIGURE 1, these joints J are used for the elbow and knee joints of the skeleton frame structure 10. Each hinge joint J includes a tenon 26 closely fitting into the slot 28 of a clevis 30. The tenon 26 and clevis 30 each have a cylindrical anchoring member 32 and 34, respectively, formed integrally therewith. In the assembled joint a spring pin 36 extends through the holes 38 in the clevis and passes through a hole 40 in the tenon 26.

This spring pin 36 has the configuration of a longitudinally split tube of resilient spring material, for example of spring steel, which provides a C-shaped cross section. The spring pin 36 in its relaxed state, as shown in FIGURE 2, has a slightly larger outside diameter than the size of the holes 38 and 40, and the longitudinal split 42 is open a substantial distance. During assembly of the joint J, the spring pin 36 is compressed so that the longitudinal split 42 is closed and then the pin 36 is inserted through the aligned holes 38 and 40.

When the pin 36 is released in position within the holes 38 and 40, as shown in FIGURE 3, it expands into firm frictional engagement with the walls of these holes. Because the original relaxed size of the spring pin was larger than these holes, it continues to exert this firm frictional force as the joint is turned into different angular positions. In operation this joint is readily adjustable and then holds whatever position into which it is adjusted, as may be desired.

To assure that the hinge joint J be flexed through an angle greater than 90° corresponding to the movement of the elbow or knee, there is sufficient clearance provided between the end of the slot 28 and the end of the tenon 26 and also sufficient clearance between the ends of the clevis 30 and the shoulders 44 at the base of the tenon 26. Alternatively, if desired, this clearance can be reduced by shaping these mating parts along arcuate contours concentric about the axis of the pivot pin 36. However, the square-ended tenon and clevis construction as shown is preferred as being easier to fabricate for the joints J. The spring pivot 36 is advantageously of a type which is commercially available.

When assembling the skeleton frame 10, the anchoring members 32 and 34 are secured to the adjacent ends of the right tubular element 16 by telescoping them into the ends of these tubular elements and then securing them in place by adhesive or by mechanical attachment, such as by indentations driven into the tubular elements, i.e., often called "staking."

Figure 4:
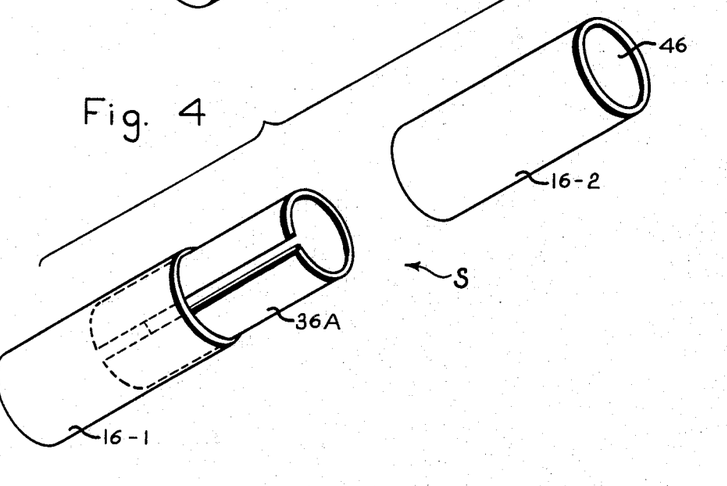
FIGURE 4 is an exploded perspective view of a swivel joint.

As shown in FIGURE 4, a swivel connection S is formed by cutting a rigid tubular element 16 into two portions 16–1 and 16–2 and by telescoping a spring pin 36A of the same identical type as the spring pin 36 into the bores 46 of the adjacent ends of the two portions 16–1 and 16–2. It will be understood that the spring pin 36A has a relaxed diameter slightly greater than the diameter of the bore so as to provide a firm frictional engagement with the two parts of the tubular element. Thus, advantageously the swivel connections are easy to adjust but hold their adjusted positions.

Figures 5, 6:
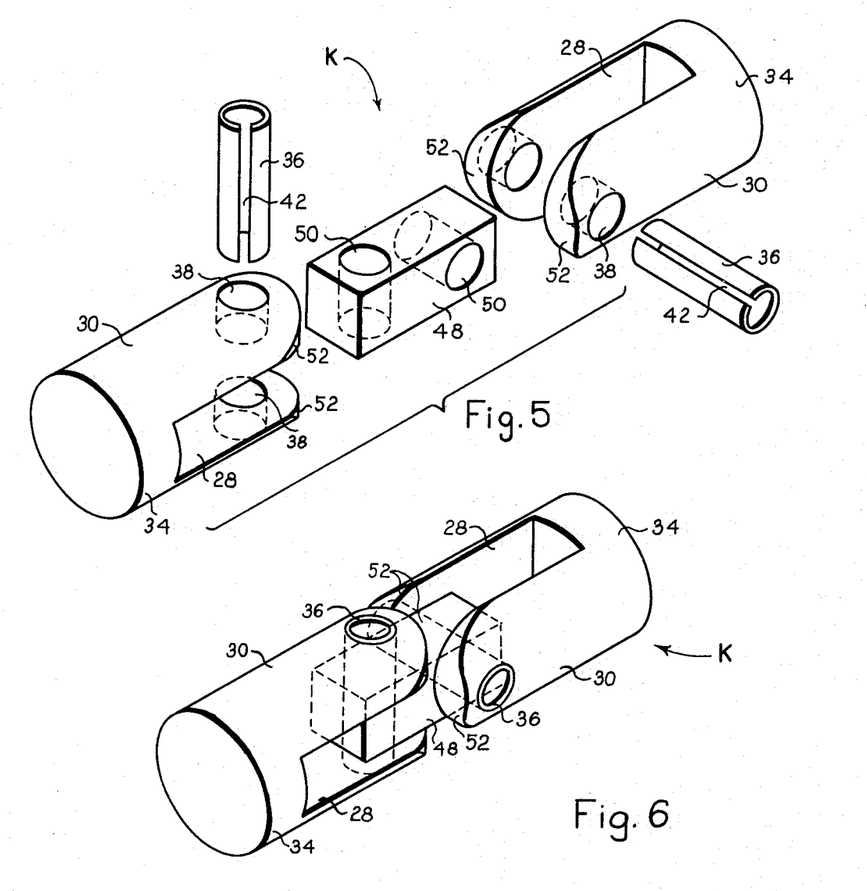
FIGURE 5 is an exploded perspective view of a double-hinge joint which can be flexed in two directions at right angles to each other and is adapted to be used for such joints as the shoulder or hip.
FIGURE 6 is a perspective view of the double-hinge joint as shown in FIGURE 5.

FIGURES 5 and 6 illustrate a double-hinge joint K which is adapted to be flexed in two directions at right angles to each other. The joint K includes a pair of clevises 30 with the planes of their slots 28 oriented at right angles to each other. A double-ended tenon hinge block 48 fits snugly into the two slots 28 and has a pair of holes 50 therein with their axes at right angles to each other adapted to align with the respective holes 38. It is noted that the holes 50 in the tenon block 48 are positioned closely adjacent so that there is very little distance between the axes of the two pivots. To prevent interference between the ends of the two closely positioned clevises 30 as they are adjusted into various angular positions these ends 52 are rounded concentric about the respective axes of the pivots. Thus, advantageously, as shown in FIGURE 6, the axes of the two pivot pins 36 in the double hinge K are offset by a distance less than twice the diameter of the pivot pin. This offset is so small compared with the over-all size of the skeleton frame that the effect is substantially the same as if the axes of the two pivots intersected. These spring pivots 36 have a relaxed diameter just slightly greater than the diameter of the holes into which they fit so as to provide the firm frictional engagement discussed above.

Double-hinge joints K are used to form the shoulder and hip joints of the skeleton frame structure in conjunction with swivel joints S. The swivel joints S are positioned in each of the upper arm skeleton elements 16 adjacent to the double-hinge joint K. Similarly, there are swivel joints S positioned in each of the upper leg skeleton elements 16.

Advantageously, this combination of the double-hinge joint K plus a swivel joint S provides a freedom of movement for the limb of the manikin comparable with that of the ball and socket type of joint in shoulder and hip of the human body.

This combination of a double-hinge joint K together with a swivel joint S is utilized to advantage in the neck portion of the skeleton. This arrangement provides freedom of movement for the head of the manikin which appears to be very natural and substantially the same in effect as the movement of the neck portion of the spinal column in the human body.

At a position approximately one-third of the way up the spinal frame element 54 from the T connection 14 toward the X connection 12, there is positioned a combined joint 56 comprising a double-hinge joint K in conjunction with a swivel joint S. Experimentation has shown that this combined joint arrangement 56 at the position illustrated in FIGURE 1 advantageously provides a life-like simulation of the movement of the human spine between the shoulders and pelvis.

A double-hinge joint K is positioned to form the wrist joints 58 and ankle joints 60. In the human body there are two bones in the forearm which can move relative to the elbow and wrist joints such that the position of the wrist can be turned with respect to the elbow. In the skeleton frame as shown in FIGURE 1, a swivel joint S is incorporated into the medial portion of the rigid skeleton frame element 16 of the forearm thus providing a swivel connection 62. This swivel 62 at the mid-portion of the forearm enables the wrist to be moved and positioned in a very natural manner so as to create a truly life-like appearance when the manikin is used to display sports equipment or the like in which the visual impact of the display is enhanced by a dynamic portrait. This dynamic type of store window display is not often attempted with manikins which were in use prior to the present invention because of their limitations which are overcome by the present invention. Advantageously, the complete articulation of the skeleton frame as shown in FIGURE 1 is provided by the use of spring pins 36 and 36A in hinge and swivel joints of the type shown in FIGURES 2–6.

Figures 7, 7A:
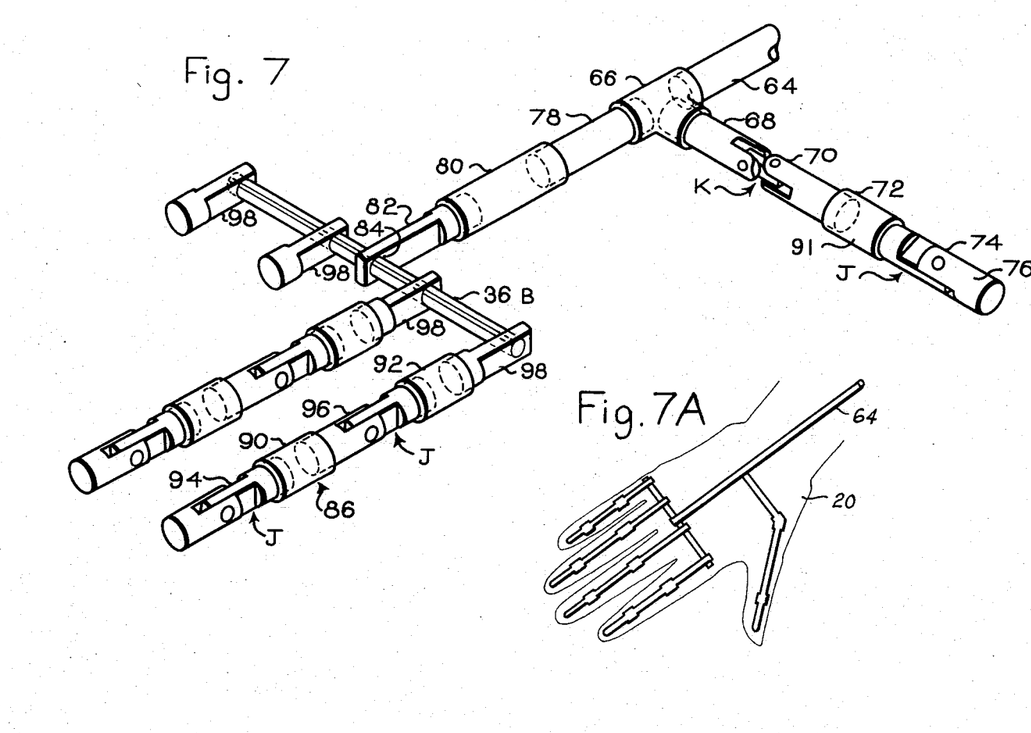
FIGURE 7 is a perspective view of the joint and swivel skeleton structure used within the hands of manikins embodying the present invention.
FIGURE 7A illustrates the hand skeleton structure of FIGURE 7 embedded within the resilient flexible hand form.
Figure 8:
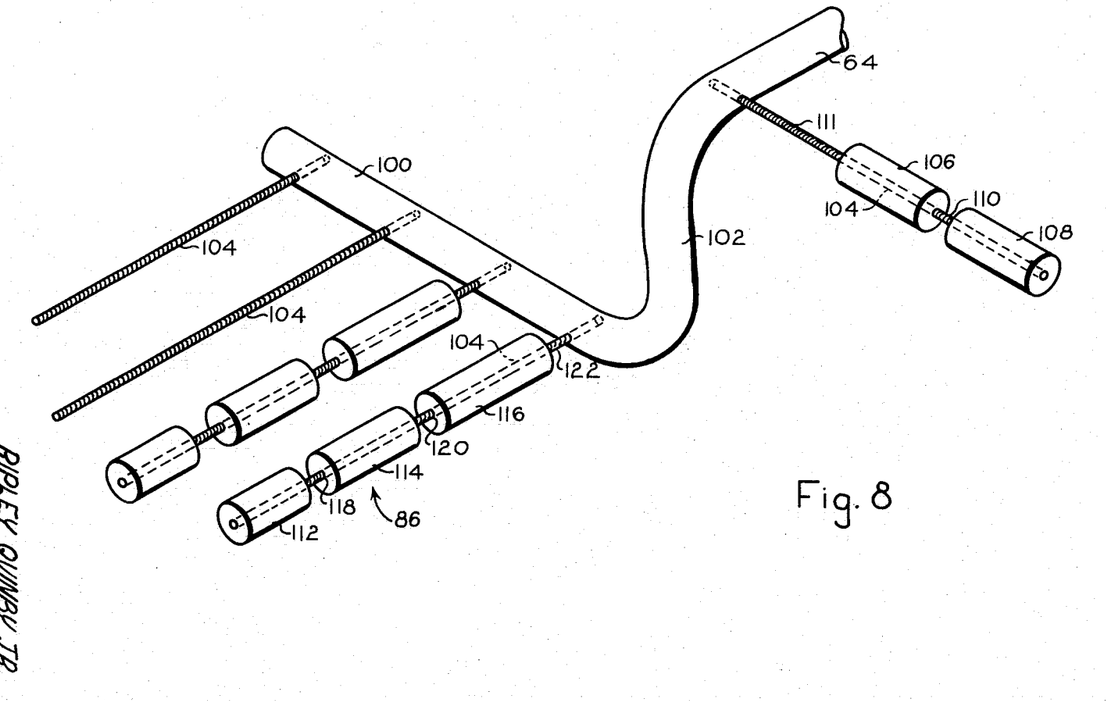
FIGURE 8 is a perspective view of an alternative structure which may be used within the hands of manikins.

In order to provide the skeleton frame within the hands of manikins, the skeleton frame structure as shown in either FIGURE 7 or 8 may be utilized to advantage. In FIGURE 7 is shown a joint and swivel connection structure wherein the frame element 64 below the wrist joint 58 is attached to a T connection 66 with a clevis 68 extending laterally therefrom and forming the base of the thumb. This clevis 68 is connected to a double-hinge joint 70 with a tubular segment 91 corresponding to the bone of the thumb and an outer single-hinge joint 74 and a tip portion 76 completing the frame for the thumb. It will be noted that the outer joint 74 is secured in position so that the axis of flexing movement is at an angle of approximately 45° with respect to the plane of the palm.

Extending from the T connection 66 is a short rigid cylindrical element 78 fitting into a tubular connection sleeve 80. The element 78 and the sleeve 80 form the frame for the hand.

In order to provide the four knuckles at the roots of the fingers, a hinge joint member 82 is anchored in the sleeve 80 and has a hole 84 extending transversely through its end. An elongated spring pin 36B extends transversely through the hole 84, and the skeleton structures 86 for the four fingers are mounted in spaced relation upon this hinge pin 36B. These skeleton structures 86 for the fingers are all identical except that the relative lengths of the connection sleeves 90 and 92 between the respective joints are different, corresponding with the differences in length of the finger bones in a human hand. The first joint 94 and the second joint 96 are each provided by a single-hinge joint J of the type described further above. The knuckle joint or third joint at the roots of the fingers are provided by hinge members 98 which pivotally engage the elongated spring pin 36B. Thus, advantageously, the skeleton frame for the hand is constructed by utilizing the hinge and swivel units as shown in FIGURES 2-6.

Although the articulated structure shown in FIGURE 7 is well adapted for use in the hands of manikins for representing adults and children over ten years of age, I have found that for smaller manikins' hands, representing younger children, another skeleton structure as shown in FIGURE 8 works to advantage. The reason for this is that the hands of younger children have a more pliable or flexible appearance, that is, the joints are less pronounced. As shown in FIGURE 8, in these smaller hands a flexible appearance is created by utilizing a wire core for each of the fingers and for the thumb.

In FIGURE 8 the skeleton frame element 64 which is connected to the wrist joint 58 is extended down further than it is in FIGURE 7, and the added length is then curved and bent across at the outer end into the shape of an inverted FIGURE 7. The laterally extending portion 100 of this rigid element forms the roots for the fingers, and the curving intermediate portion 102 provides the frame for the palm of the hand.

In order to provide a skeleton frame for the thumb, a wire core 104 is secured by insertion into the frame element 64. This wire core 104 is of a compound structure including an inner axial wire of a soft malleable metal, for example, such as copper or lead, around which is spirally wound a harder, stiffer spring wire providing closely spaced convolutions surrounding the axial wire. This stiffer wire is, for example, a steel wire or a hard-drawn brass wire. These convolutions of the harder wire assure a more even bending of the inner soft core, because any tendency for sharp localized bending to occur is resisted by these convolutions which then abut against each other. Consequently, fatigue of the soft wire core is reduced, and the over-all appearance of the hand is improved.

For purposes of defining the regions of flexing of the wire core 104, there are two separated rigid sleeves 106 and 108 which are secured to the wire core 104. The wire core section 110 between these rigid sleeves provides the first joint of the thumb, while the inner section 111 of the wire core 104 between the elements 64 and 106 corresponds in action with the second joint and wrist joint of the thumb of a young child's hand.

Similarly, the skeleton frames for the fingers 86 are supplied by compound wire cores 104 secured into the transverse mounting 100. Each of the fingers 86 includes three spaced rigid sleeves 112, 114 and 116, thereby defining the first, second and third joints 118, 120 and 122, respectively.

Figure 9:
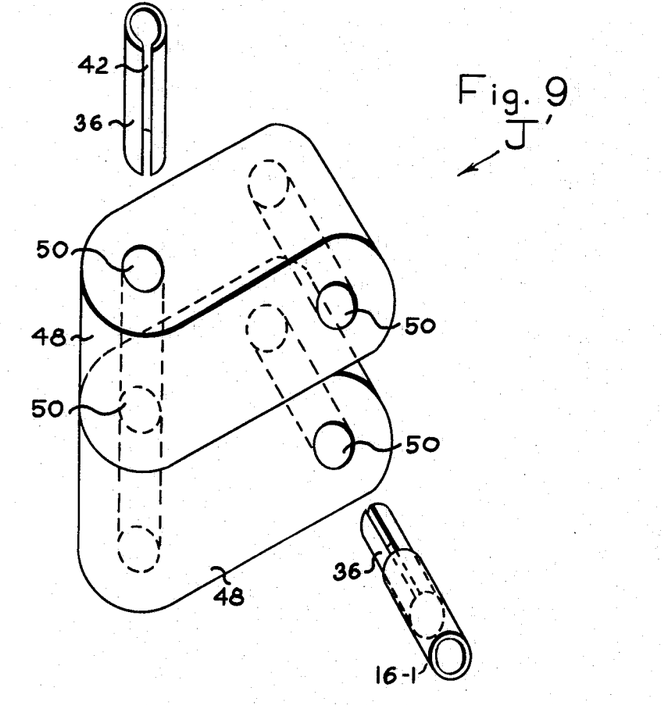
FIGURE 9 is a perspective view of an alternative embodiment of a joint such as an elbow or knee joint.

In FIGURE 9 is an alternative embodiment J' of the hinge joints J. From the following description it will be appreciated that this alternative J' provides additional advantages for which it is preferred. This joint J' includes two similar hinge blocks 48 having a pair of openings 50 extending through opposite ends at right angles to each other. A spring pin 36 passes through the aligned holes 50 at the adjacent ends of both blocks and provides a hinge pivot. The remaining two holes are used to form an easy to make and convenient connection formed between the joint J' and the skeleton elements 16-1 by using spring pins 36. Although only one skeleton element 16-1 is indicated in FIGURE 9 it will be understood that when the skeleton is completed there is a corresponding skeleton element connected by a spring pin extending into the opening 50 in the upper hinge block. A further advantage of the hinge J' is its ability to swing through a full sweep of 180° or more, as may be desirable to represent the full range of movement of the elbow or knee joints of various persons. In fact, it is possible to swing this joint J' through an angle of 360°, but only a desired portion of this available movement is used in actual practice.

Figure 10:
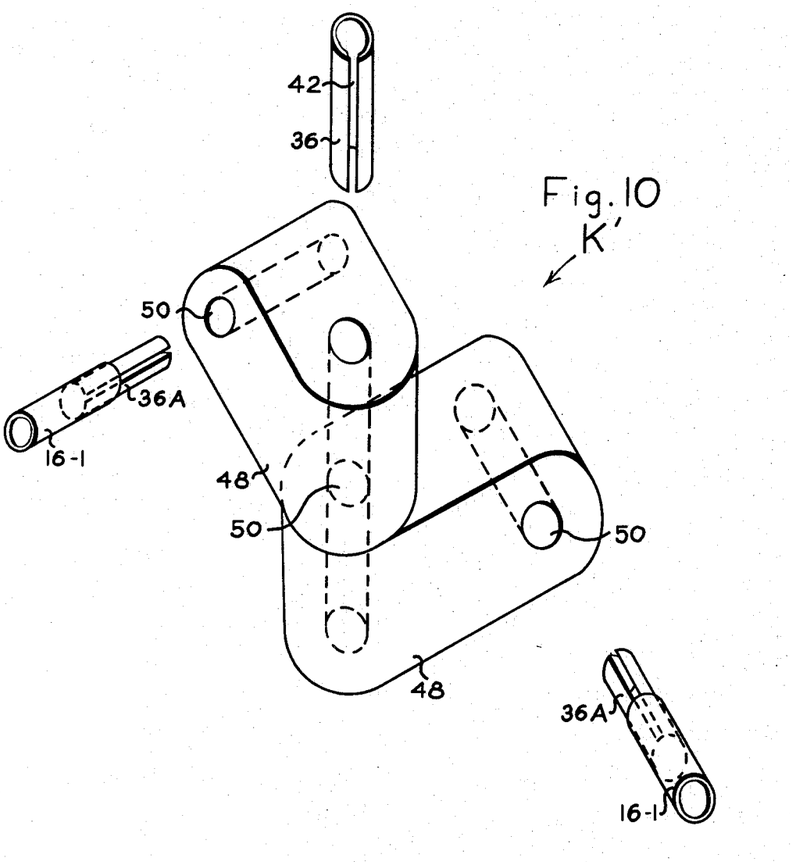
FIGURES 10 and 11 are perspective views of alternative embodiments of double hinge joints.

An alternate embodiment K' of the double hinge joint K, as used in the hip and shoulder joints, is shown in FIGURE 10. The hinge blocks 48 are similar and advantageously are the same as those described in FIGURE 9, but their adjacent faces are positioned with their axes at right angles to one another and are hinged together by means of a spring pin 36. The swivel joints are incorporated into this alternate embodiment K' of the joint at the points at which this alternate embodiment is assembled to the skeleton elements 16-1 by means of the spring pins 36A. Thus, the swivel action is like that obtained in the swivel S shown in detail in FIGURE 4. This double hinge joint K' has the advantage that the two components of motion are provided by using only two types of parts, namely the spring pins and hinge blocks 48.

Figure 11:
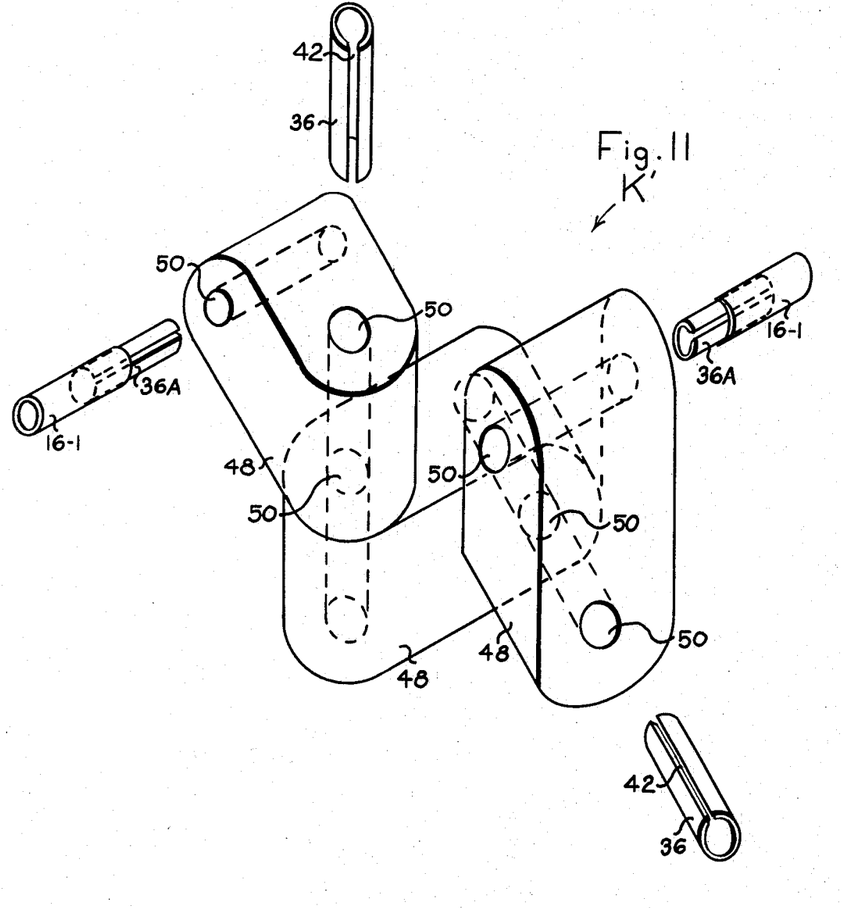

In FIGURE 11 is shown a further alternative embodiment K' of a double hinge joint K as used in the neck and waist 56. The blocks 48 are similar and are advantageously the same as those described in FIGURES 9 and 10. The three blocks 48 are positioned in such a manner that the adjacent faces are attached with their axes at right angles to one another by means of spring pins 36. Also, a swivel joint action S is incorporated into the alternate embodiment K' of the joint at one of the points at which this joint is assembled to the elements 16-1 of the skeleton frame 10. A similar joint K' is used in the wrist joints 58 and in the ankle joints 60 but without the incorporation of the swivel joint action S, i.e. a rigid connection is made between the joint K and the skeleton elements, for example by cementing the spring pins 36A in place. The rounded ends of the blocks 48 save space and weight and prevent damage to the flexible body material surrounding the skeleton.

From the foregoing description it will be understood that manikins embodying the present invention are well adapted to provide the many advantages described above, and that various changes or modifications may be made therein in accordance with the present invention, each as may be best suited to a particular size of manikin and for ease of fabrication and for various display purposes, and the scope of the present invention as defined by the following claims is intended to include such modifications or adaptations limited only by the prior art.

What is claimed is:

1. A human-appearing manikin having joint movements corresponding with those of a human being comprising a body of resilient material, a skeleton structure within said body, said skeleton structure including a spinal column, a pair of transverse members extending outwardly from opposite sides of the upper portion of the spinal column for supporting the shoulder portions of said body, articulated frame elements within the arm portions of the body, and a shoulder joint between each of said articulated frame elements and said transverse members comprising a double-hinge joint connected to said transverse member and a swivel joint connected to said double-hinge joint.

2. A human-appearing manikin having joint movements corresponding with those of a human being comprising a skeleton structure for a manikin body including a spinal column, a pair of transverse members extending outwardly from opposite sides of the upper portion of the spinal column for supporting the shoulder portions of said body, articulated frame elements within the arm portions of the body, a shoulder joint between each of said articulated frame elements and said transverse members comprising a double-hinge joint connected to said transverse member, and a swivel joint connected to said double-hinge joint, a second pair of lateral members extending outwardly from opposite sides of the lower portion of the spinal column for supporting the hip portions of the body, articulated frame elements within the leg portions of the body, and a hip joint between each of said articulated frame elements and said lateral members comprising a double-hinge joint connected to said lateral members, and a swivel joint connected to said double-hinge joint.

3. The method of making a human-appearing manikin comprising the steps of making a cast of a living person, molding a resilient flexible body form in said cast in two halves, front and back, each of said halves being molded as an integral unit, said body form having a smooth, skin-like outer surface, inserting an articulated skeleton frame structure between said two halves, and cementing said two halves together about said frame structure to complete the manikin.

4. A human-appearing manikin having body movements corresponding in appearance with those of a human being comprising a body of resilient material, a skeleton structure within said body, said skeleton structure including a spinal column, an upper pair of transverse members extending outwardly from opposite sides of the upper portion of the spinal column for supporting the shoulder portions of said body, a lower pair of transverse members extending outwardly from opposite sides of the lower portion of the spinal column for supporting the hip portions of the body, said spinal column comprising a first rigid rod member extending down from said upper transverse members, a second rigid rod member extending up from said lower transverse members, a double-hinge joint and a swivel joint connected in serial relationship between said rigid rod members.

5. A human-appearing manikin having body movements corresponding in appearance with those of a human being comprising a body of resilient material, a skeleton structure within said body, said skeleton structure including a spinal column, an upper pair of transverse members extending outwardly from opposite sides of the upper portion of the spinal column for supporting the shoulder portions of said body, a lower pair of transverse members extending outwardly from opposite sides of the lower portion of the spinal column for supporting the hip portions of the body, said spinal column comprising a first rigid rod member extending down from said upper transverse members, a second rigid rod member extending up from said lower transverse members, said first rigid rod member having approximately twice the length of said second rigid rod member, a double-hinge joint and a swivel joint connected in serial relationship between said rigid rod members.

6. A human-appearing manikin having body movements corresponding in appearance with those of a human being comprising a skeleton structure for a manikin body including a spinal column, an upper pair of transverse members extending outwardly from opposite sides of the upper portion of the spinal column for supporting the shoulder portions of said body, a lower pair of transverse members extending outwardly from opposite sides of the lower portion of the spinal column for supporting the hip portions of the body, said spinal column comprising a first rigid rod member extending down from said upper transverse members, a second rigid rod member extending up from said lower transverse members, a double-hinge joint of the tenon and clevis type, and a swivel joint connected in serial relationship between said rigid rod members, said double-hinge joint having a pair of pivots formed by spring pins, and said swivel joint including one end of said double-hinge joint having a recess extending longitudinally thereof, one end of said rigid rod members having a recess extending longitudinally thereof, and a spring arm having its opposite ends extending into said recesses.

7. In a manikin for use in store windows, demonstrations, modeling purposes, and the like, a body skeleton including an upper limb frame, joint mechanism for simulating the ball-and-socket shoulder and hip joints in the human body for connecting the upper limb frame to the body skeleton comprising a double-hinge joint including a plurality of hinge blocks having a pair of pivots closely spaced and oriented substantially perpendicularly to each other, said pivots being formed by a pair of spring pins, a first end of said doube-hinge joint being adapted to be connected to the body skeleton, and a swivel joint for connecting the second end of said double-hinge joint to the frame of the upper limb, said swivel joint including a recess in a hinge block of said double-hinge joint, and a longitudinal recess in the frame of the upper limb and a spring pin having its opposite ends inserted into said recesses.

8. In a manikin for use in store windows, demonstrations, modeling purposes, and the like, joint mechanisms as claimed in claim 7, and wherein said spring pin in the swivel joint is of the same type as said pair of spring pins in the double-hinge joint.

9. In a manikin for use in store windows, demonstrations, modeling purposes, and the like, joint mechanisms as claimed in claim 8 and wherein said spring pins all have a C-shaped cross sectional configuration.

10. The method of making a human-appearing manikin starting from a live human being comprising the steps of making a flexible mold of the living person, casting a rigid body figure in said mold, forming a parting layer around said figure and bisecting the space around said figure into two halves, front and back, forming a flexible mold in two halves front and back around said figure and against said plane, said two flexible mold halves each being an integral unit, casting flexible front and back halves of said body figure in said flexible mold halves, forming a final rigid front and a final rigid back mold half around said flexible halves of said body figure, forming the final flexible components of the manikin body in said final mold halves, and cementing said flexible components together around an articulated skeleton to complete the manikin.

References Cited
UNITED STATES PATENTS

| | | | |
|---|---|---|---|
| 794,643 | 7/1905 | Rimpler et al. | 156—61 |
| 1,189,585 | 7/1916 | Kruse | 223—68 X |
| 2,281,741 | 5/1942 | Boulard | 223—68 |
| 2,285,376 | 6/1942 | Lovell | 223—68 |
| 2,826,052 | 3/1958 | Stillwagon | 64—17 |
| 2,549,074 | 4/1951 | Fishbein et al. | 3—12.7 |
| 1,005,153 | 10/1911 | Case | 285—397 X |
| 1,579,367 | 4/1926 | Hymer | 46—161 |
| 2,709,318 | 5/1955 | Benjamin | 46—26 |
| 139,932 | 6/1873 | Sweetland | 285—397 X |
| 2,362,383 | 11/1944 | Lendinara | 287—101 X |
| 1,400,066 | 12/1921 | Huck | 46—29 |

FOREIGN PATENTS

| | | |
|---|---|---|
| 1,060,516 | 4/1954 | France. |
| 123,892 | 6/1959 | Russia. |

PATRICK D. LAWSON, *Primary Examiner.*

G. V. LARKIN, *Assistant Examiner.*